(12) United States Patent
Roe et al.

(10) Patent No.: US 9,875,504 B1
(45) Date of Patent: Jan. 23, 2018

(54) REAL-TIME VIDEO STREAMING OF MARINE LIFE FOR SALE

(71) Applicants: Evan Gates Roe, Celina, TX (US); Ryan John Roe, Port Saint Lucie, FL (US); Russell Thomas Jordan, Fort Collins, CO (US)

(72) Inventors: Evan Gates Roe, Celina, TX (US); Ryan John Roe, Port Saint Lucie, FL (US); Russell Thomas Jordan, Fort Collins, CO (US)

( * ) Notice: Subject to any disclaimer, the term of this patent is extended or adjusted under 35 U.S.C. 154(b) by 255 days.

(21) Appl. No.: 14/623,479

(22) Filed: Feb. 16, 2015

Related U.S. Application Data

(60) Provisional application No. 61/940,447, filed on Feb. 16, 2014.

(51) Int. Cl.
*G06Q 30/06* (2012.01)
*H04L 29/06* (2006.01)
*H04N 7/18* (2006.01)

(52) U.S. Cl.
CPC ..... *G06Q 30/0643* (2013.01); *G06Q 30/0635* (2013.01); *H04L 65/4069* (2013.01); *H04N 7/183* (2013.01)

(58) Field of Classification Search
CPC combination set(s) only.
See application file for complete search history.

(56) References Cited

U.S. PATENT DOCUMENTS

| | | | |
|---|---|---|---|
| 6,424,727 B1 * | 7/2002 | Musgrave | A01K 11/006 |
| | | | 382/116 |
| 6,443,840 B2 * | 9/2002 | Von Kohorn | 348/E7.024 |
| 8,266,315 B2 | 9/2012 | van Oldenborgh et al. | |
| 8,291,320 B2 | 10/2012 | Robbin et al. | |
| 8,296,259 B1 | 10/2012 | Trandal et al. | |
| 8,350,908 B2 | 1/2013 | Morris et al. | |
| 8,374,921 B2 | 2/2013 | Diaz Perez | |
| 8,527,392 B2 * | 9/2013 | Levy | G06Q 30/08 |
| | | | 705/37 |

(Continued)

FOREIGN PATENT DOCUMENTS

KR     2013117999 A  *  4/2016  .............. G06Q 30/06

*Primary Examiner* — Yogesh C Garg
*Assistant Examiner* — Lalith Duraisamygurusamy
(74) *Attorney, Agent, or Firm* — Law Office of Sam Sokhansanj PLLC

(57) ABSTRACT

A method and system is provided for a merchant to display live streaming video feeds of live items, such as marine life, for sale to a buyer through an online e-commerce website. More specifically, the method can include placing the item within a storage vessel, positioning a video recording camera adjacent to the storage vessel, and capturing streaming video from the camera of the item. The method can further include transmitting the streaming video of the item to a client portal, receiving an order request from the client, processing the order request, updating an inventory based on the processed order request, and ceasing transmission of the streaming video to the portal based on the processed order. The method and system provide a simple, automated, and reliable method for a buyer to purchase live items from a merchant wherein the buyer can see exactly the item he or she is purchasing, including the physical condition, configuration, size, health, and overall well-being of the item.

10 Claims, 12 Drawing Sheets

(56) References Cited

U.S. PATENT DOCUMENTS

| | | |
|---|---|---|
| 8,577,739 B2 | 11/2013 | Ansari et al. |
| 2009/0083323 A1* | 3/2009 | Elliott ................ G06Q 30/0603 |
| 2013/0088615 A1* | 4/2013 | Altieri .................... H04N 5/225 |
| | | 348/231.3 |

* cited by examiner

REAL-TIME VIDEO STREAMING OF MARINE LIFE FOR SALE

CROSS-REFERENCE TO RELATED APPLICATION

This application claims the benefit of U.S. Provisional Application No. 61/940,447 filed on Feb. 16, 2014, which is incorporated herein by reference in its entirety.

FIELD OF THE INVENTION

The present disclosure is related to real-time interactive video streaming of goods or items for sale from a merchant location.

BACKGROUND

This section is intended to introduce the reader to aspects of art that may be related to various aspects of the present invention or present solution, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

On-line shopping, or e-commerce, has in recent years become a popular way for consumers to shop for goods. Examples of popular consumer oriented e-commerce web sites include the well-known eBay® and Amazon.com® web sites as well as various shopping sites dedicated to goods from a particular vendor. These e-commerce sites typically provide static images of items or goods for sale with little interaction between vendors/merchants and potential buyers/customers aside from the ability to e-mail questions from a shopper to a vendor and viewing images of the items. Specifically, the potential buyer does not know when the static images of the items for sale were actually taken, nor if they are of the same or actual item for sale, particularly if the item is a live or living specimen (i.e., fish, plant, animal, insect).

Other e-commerce web sites, including those associated with organizations such as QVC®, Inc. and the Home Shopping Network®, Inc. provide videos of people selling products and links to purchase said products. For example, a web site associated with QVC®, Inc. permits potential buyers who are accessing the web site to send text messages that may be relayed to a person in a video selling the product. However, these television ordering and e-commerce web sites typically only provide a static representation, sample, or model of the item being sold and not the actual item that the buyer will be receiving.

Hence, there is a need for a method and system for allowing a buyer to purchase animals, items, or goods for sale by viewing live streaming video of the actual items or goods being offered for sale from a merchant and purchasing the animals, items, or goods.

BRIEF SUMMARY OF THE INVENTION

The present disclosure overcomes the drawbacks and shortfalls of prior attempted methods and systems for a buyer to purchase items such as marine life from e-commerce websites. Specifically, in one or more aspects of the present disclosure, a buyer is presented at a buyer portal with a live streaming video of one or more specific item being offered for sale by a merchant. The buyer can interactively view the live streaming video feed of the actual item at the merchant's facility and also communicate with the merchant regarding the item being viewed. More particularly, the present disclosure provides a simple, automated, and reliable method for a buyer to purchase items from a merchant wherein the buyer can see exactly what he or she is purchasing, including the physical condition, configuration, size, health, and/or well-being of the item being purchased, among others. Further, the present disclosure can boost consumer confidence and trust in items being purchased at a merchant location and further improve customer loyalty.

In further aspects of the present disclosure, a method for displaying and streaming video of items at a portal are provided. The method can include placing an item within a storage vessel, positioning a video recording camera adjacent to the storage vessel, and capturing streaming video from the camera of the item. The method can further include transmitting the streaming video of the item to a portal for viewing at the portal, receiving an order request of the time from the portal, processing the order request, updating an inventory based on the processed order request, and ceasing transmission of the streaming video to the portal based on the processed order. Here, the video streaming can include one or more of live, real-time, near real-time, and recorded video. The item can be comprised of marine life, such as fish, invertebrate, reptiles, mammals, corals, and plants. The item can also be non-living inanimate objects. Further, the storage vessel can be an aquarium tank, wherein the storage vessel further includes a measurement guide or scale. Here, the portal can be one or more web pages accessible by a web browser. The method can further include a plurality of cameras assigned to a plurality of storage vessel at a merchant facility, wherein the cameras are configured to automatically adjust position or location based on the updated inventory.

In another aspect of the present disclosure, a method for displaying and streaming video of marine animal at a portal is provided. The method can include placing at a merchant facility a live marine animal within an aquarium tank, wherein the marine animal is assigned to the tank, positioning a video recording device adjacent to the tank, wherein the device is assigned to the tank via an identification code, capturing video of the marine animal within the tank from the merchant facility, and transmitting live video of the marine animal in real-time to a remote end user portal for viewing of the marine animal within the tank. The method can further include receiving an order request of the marine animal from the end user portal, processing and fulfilling the order request, removing the marine animal from the tank at the merchant facility, updating inventory based on the processed order request, and re-assigning and moving the camera to another aquarium tank having another marine animal for live video transmission to the end user portal.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

Figure 1:
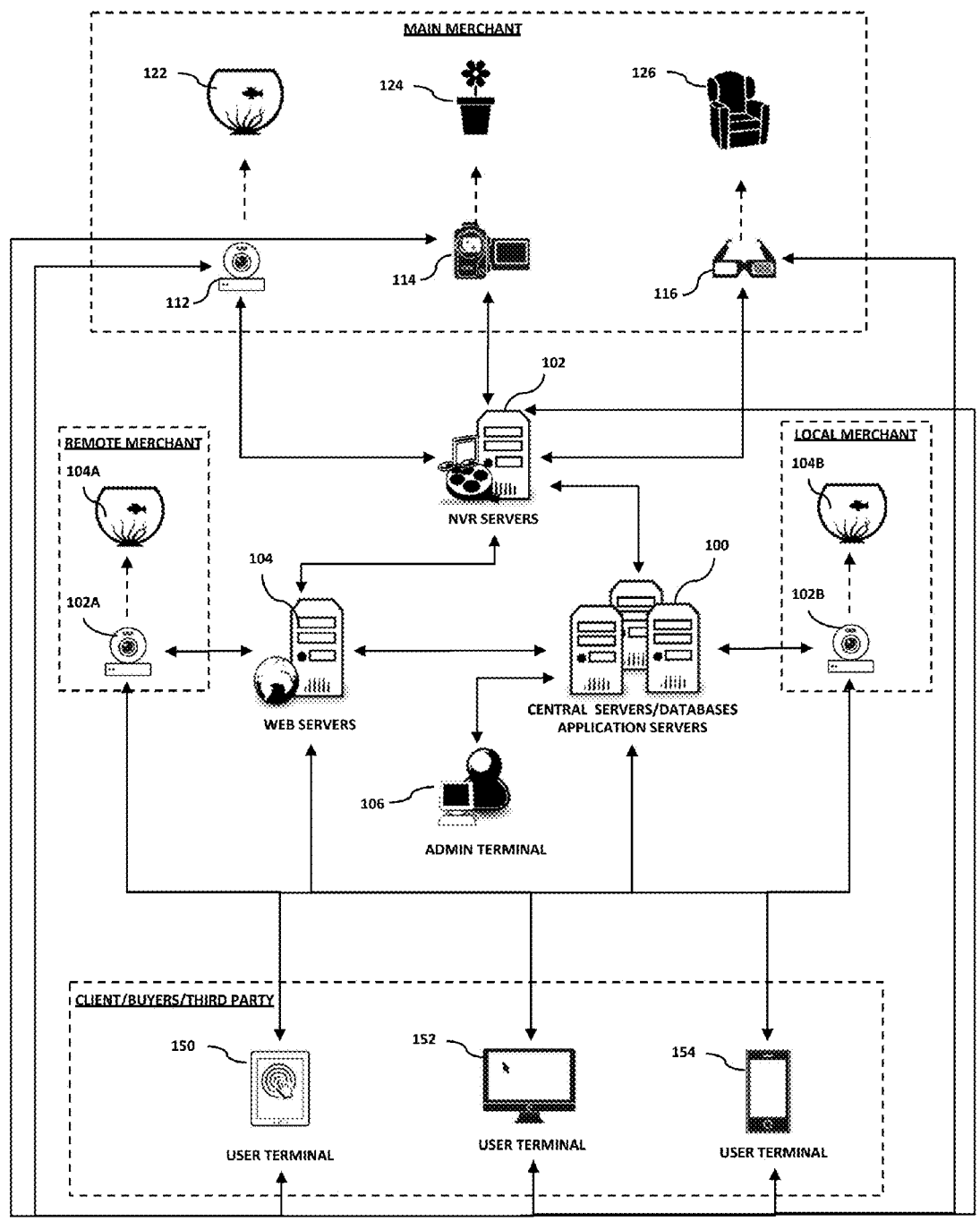
FIG. 1 illustrates one non-limiting embodiment of an overall network architecture of the present disclosure.

In the Brief Summary of the present disclosure above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The embodiments set forth below represent the necessary information to enable those skilled in the art to practice the invention and illustrate the best mode of practicing the invention. In addition, the invention does not require that all the advantageous features and all the advantages need to be incorporated into every embodiment of the invention.

The present disclosure provides web/internet, computer, and mobile applications, systems, and method for ordering live or pre-recorded video content of items for sale from a merchant. Various aspects of the invention described herein may be applied to any of the particular applications set forth below or for any other types of user interfaces and video displays, or to the present disclosure. The invention may be applied as a standalone system or method, or as part of an integrated software package. It shall be understood that different aspects of the invention can be appreciated individually, collectively, or in combination with each other.

Video displays may include devices upon which information may be displayed in a manner perceptible to a user at a user terminal or admin terminal, such as, for example, a computer monitor, cathode ray tube, liquid crystal display, light emitting diode display, touchpad or touch-screen display, wearable glasses or eyewear, wearable contact lenses for displaying digital or video data, and/or other means known in the art for emitting a visually perceptible output. Video displays may be electronically connected to a mobile device according to hardware and software known in the art. A graphics controller residing on a mobile device can display the graphical user interface (GUI) of the present disclosure on a video display of the mobile device.

In one implementation of the invention, a display page may include information residing in the computing device's memory, which may be transmitted from the computing device over a network to merchant or third party center and vice versa. The information may be stored in memory at each of the computing device, a data storage resided at the edge of the network, or on one or more servers. A mobile device, computing device, or end device may receive non-transitory computer readable media, which may contain instructions, logic, data, or code that may be stored in persistent or temporary memory of the mobile device, or may somehow affect or initiate action by a mobile device or end device. Similarly, one or more servers may communicate with one or more mobile or end devices across a network, and may transmit computer files residing in memory. The network, for example, can include the Internet, wireless communication network, or any other network for connecting one or more mobile or end devices to one or more servers.

Any discussion of a mobile device, computing device, or end device may also apply to any type of electronic networked device, including but not limited to phones such as cellular phones (e.g., an iPhone®, Android®, Blackberry®, or any 'smart phone'), a personal computer, tablet computer, wearable watch, Android® device, iPad®, Google® Glasses, server computer, or laptop computer; personal digital assistants (PDAs) such as a Palm-based device or Windows® device; a roaming device, such as a network-connected roaming device, a wireless device such as a wireless email device or other device capable of communicating wireless with a computer network, or any other type of network device that may communicate over a network and handle electronic transactions. Any discussion of any mobile device mentioned may also apply to other devices.

Any discussion of a camera can include any known or future device capable of capturing moving or non-moving objects and/or environment and communicating bi-directionally or one-directionally with a computing device. These cameras can include digital cameras for obtaining static images, scanners, video cameras for obtaining and rendering moving images, webcams, digital cameras, digital video cameras, IP network cameras, network video recorders (NVR), closed circuit video cameras, wearable eyewear for capturing images or video, and related. In addition the camera can be a stand-alone device or integrated with another device, such as a computing device.

On a computing device, mobile device, or end device, the display page may be interpreted by software residing on a memory of the mobile device, causing the computer file to be displayed on a video display in a manner perceivable by a user (e.g. buyer/client/merchant). The display pages described herein may be created using a software language known in the art such as, for example, the hypertext mark up language ("HTML"), the dynamic hypertext mark up language ("DHTML"), the extensible hypertext mark up language ("XHTML"), the extensible mark up language ("XML"), Java, C/C#/C++, or another software language that may be used to create a computer file displayable on a video display in a manner perceivable by a user. Any computer readable media with logic, code, data, instructions, may be used to implement any software or steps or methodology. Where a network comprises the Internet, a display page may comprise a webpage of a type known in the art. Further, the end device can operate with or work in conjunction with any content management software (CMS) or customer relations software (CRM) which can include but not limited to WordPress, any Java based software, Microsoft ASP.NET software, Perl based software, PHP based software, Python based software, Ruby on Rails based software, ColdFusion Markup Language (CFML), or other Software as a Service (SaaS) based software.

A display page according to the invention may include embedded functions comprising software programs stored on a memory, for example, Cocoa, VBScript routines, JScript routines, JavaScript routines, Java applets, ActiveX components, ASP.NET, AJAX, Flash applets, Silverlight applets, or AIR routines. A display page may comprise well-known features of graphical user interface technology, for example, frames, windows, tabs, scroll bars, buttons, icons, menus, fields, and hyperlinks, and well-known features such as a touchscreen interface. Pointing to and touching on a graphical user interface button, icon, menu option, or hyperlink also is known as "selecting" the button, icon, option, or hyperlink. Additionally, a "point and gesture" interface may be utilized, such as a hand-gesture driven interface. Any other interface for interacting with a graphical user interface may be utilized, such as haptic feedback interfaces. A display page according to the invention also may incorporate multimedia features.

A mobile application may be a small virtual object that may offer dynamic content that can be placed on any page of the web, phone, or computer desktop environment. The mobile application may be utilized by a roaming device, such as a network-connected roaming device such as a phone, PDA, GPS, or any other mobile device. The present disclosure may provide a smaller application that may not require the complexity, power, or memory of a full-sized application. The mobile application may enable a user to interact with merchants and/or buyers, and may provide a graphical user interface for such interaction. In addition, a management software or program may reside on a first system, and a mobile application may reside on a second system. The first system and the second system may be any combination of network devices. For example, the first system may be a server and the second system may be a mobile device. The server computer may have a software program residing in its memory. The mobile device may have the present disclosure residing in a local memory. In some instances, the present disclosure may have been downloaded to the mobile device from the server. The present disclosure on the mobile device may communicate with the merchant's software program on the server. In some instances, the present disclosure may primarily function as a standalone application, but may communicate with the server application in particular situations. To be more specific, for example, the present disclosure may be on a mobile device (such as an iPhone®, Blackberry®, or other 'smart phone') and the full-sized software program may be on a computer. In other embodiments, the present disclosure may be implemented as a web page application or software as a service (SaaS) or use "cloud" computing. The present disclosure or its image or video viewing functions can be linked to other proprietary systems.

Phrases and terms similar to "software", "application", and "firmware" may include any non-transitory computer readable medium storing thereon a program, which when executed by a computer, causes the computer to perform a method or function.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Terms and phrases similar to "business", "merchant", "supplier", "vendor", or "seller" may be used interchangeably with each other and shall mean any person, entity, distributor system, software and/or hardware that is a provider, seller, merchant, broker and/or any other entity in the distribution chain of goods, items (living or non-living), or services and/or that receives payment or other consideration. For example, a merchant may be a breeder, pet store, a retail store, a service provider, an on-line merchant or the like. In addition, the merchant may be any user wanting to showcase goods, items, or services, not necessarily for purchase.

Terms and phrases similar to a "customer", "buyer", "client", and "consumer," may include any person, entity, software and/or hardware that receive goods or services in exchange for consideration (e.g. financial payment). For example, a buyer may purchase, lease, rent, barter or otherwise obtain goods or services from a merchant or vendor.

Terms and phrases similar to "marine life", "marine items", or "marine animals" may include any water, sea, ocean, lake, or pond related living species or organism. For example, living species or organisms may include any species or sub-species of fish, birds, invertebrates, mammals, reptiles, fungi, plants and algae, microscopic life, and various marine habitants. In addition, marine life may also include non-living matter, such as rocks, sand, and earth matter.

Terms and phrases similar to "item", "object, or "goods" may also include any living or non-living item. For example, living items may include any land or marine animal, mammal, fish, reptile, insect, or plant. Non-living items may include any item that is not a life form or is an inanimate object, such as physical non-living matter or intangible assets.

FIG. 1 illustrates one non-limiting embodiment of an overall system architecture of the online video streaming and purchasing method and system for items, such as marine life, fish, coral, invertebrate, animals, insects, plants, and objects that are being offered for sale, rent, or lease. Here, in one embodiment, the system includes a central server 100 communicating bi-directionally over a network with one or more video cameras 112, 114, and 116. In one embodiment, camera 112 can be a web or network video camera or plurality of connected network video recording cameras, camera 114 can be a hand-held video recording camera, and camera 116 can be a wearable eyewear camera or any mobile or wearable video camera recording device. However, it is contemplated within the scope of the invention that any of cameras 112, 114, and 116 can be any type of camera capable of obtaining videos or images, either live, real-time, near real-time, or pre-recording on a medium.

Still referring to FIG. 1, camera 112 can obtain live, real-time, near real-time, or recorded video from a live moving animal 122, such as one or more marine life or fish. Further, camera 114 can obtain live, real-time, near real-time, or pre-recorded video of a live object 114, such as one or more plants. Camera 116 can obtain live, real-time, or near real-time, or recorded video of a static non-living physical object 124, such as furniture, goods, electronics, and others. However, it is contemplated within the scope of the invention that any of cameras 112, 114, and 126 can obtain any type of image or video from any of objects 122, 124, and 126. Alternatively, in other embodiments, there may be one camera obtaining images or video of a plurality of objects (living or non-living). Still referring to FIG. 1, video or images obtained by cameras 112, 114, and 116 can be transmitted wired or wirelessly over a network in either real-time or a delayed session/time to one or more network video recorder (NVR) servers 102, wherein the images and/or videos can be stored and/or transmitted in real-time, near real-time, or delayed transmission to one or more web servers 104, one or more central servers, database, or application servers 100 where then can be retrieved, transmitted, and viewed by one or more buyers or user terminals 150, 152, and 154, such as at a client portal that can be a web browser or other portal. Here, user terminals 150-154 can be any type of computing device that can communicate bi-directionally with server 100 via a network, and the user terminal computing devices 150-154 having video displays for displaying the obtained images/videos from cameras 102, 122, and 124.

Still referring to FIG. 1, the system architecture of the present disclosure can further include one or more remote or off-site merchant locations having one or more video cameras 102A recording or live/real-time streaming one or more goods, such as marine life 104A, and transmitting the live or recorded video streaming to one or more web servers 104 or directly to servers 100, which can be viewed by user terminals 150-154. Further another local merchant may have one or more video cameras 102B recording or live/real-time streaming one or more goods, such as marine life 104B, and transmitting the live or recorded video streaming to directly to servers 100, which can be viewed or retrieved by user terminals 150-154. In addition, an administrator portal 106 can communicate directly with central server 100 for managing the one or more merchants, goods, marine life, animals, insects, plants, and others being offered for sale. More specifically, the admin portal can have a dashboard for viewing and controlling sales, inventory, marketing, traffic, video feeds, and various other aspects. For example, the administrator of the admin portal can control the operation of the video cameras for each marine life being offered for sale or streamed through central server 100 or on one or more merchant's websites. In addition, the admin portal can further control operation of the cameras within a facility that records or streams the living or non-living goods for sale, such as the movement, direction, zoom, angle, image or video quality, and other related camera functions. It is contemplated within the scope of the invention that any of cameras 112, 114, 116, 102A, and 102B may also transmit/receive data and communicate bi-directionally, weather directly or over a wired or wireless network, with user terminals 150, 152, and 154.

Figure 2:
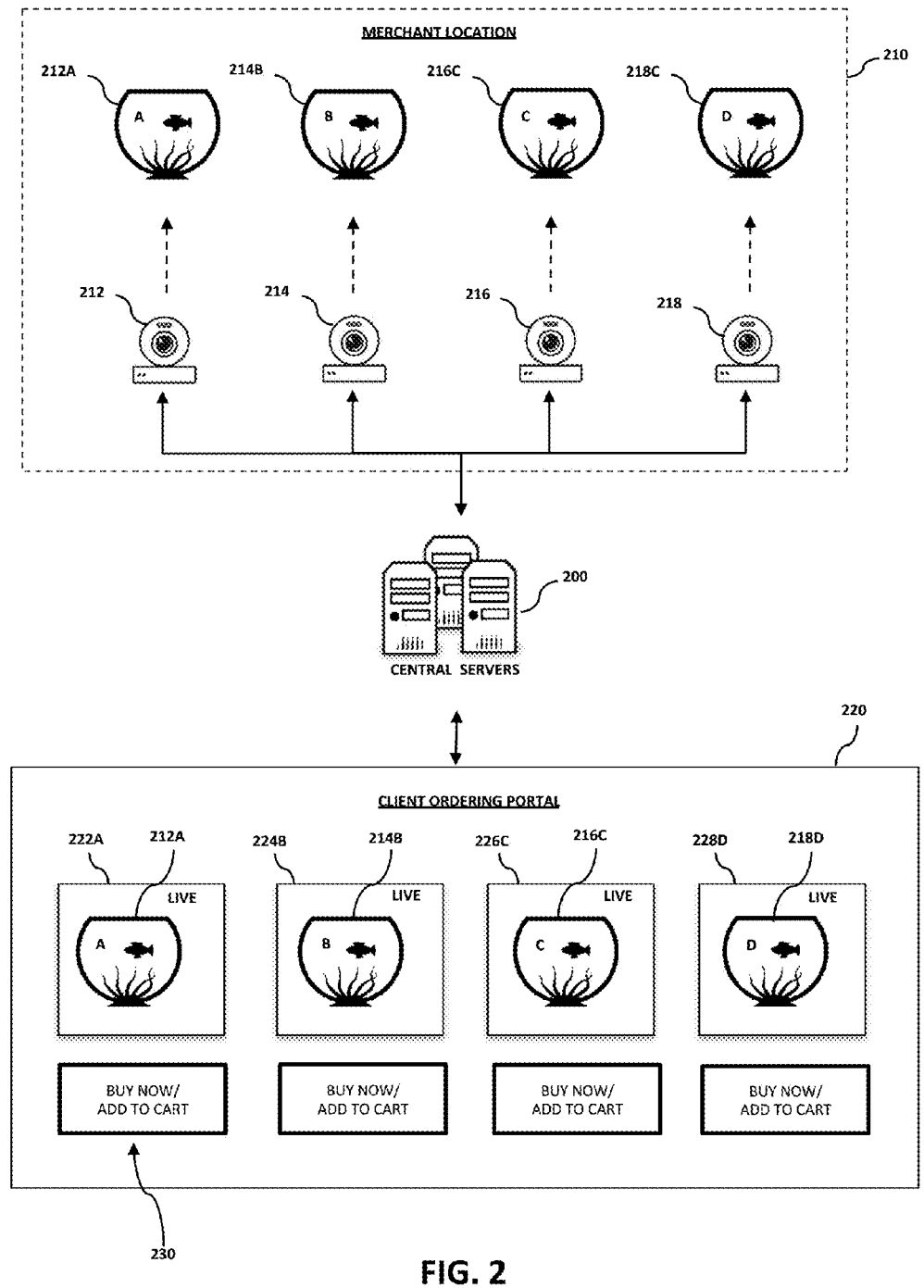
FIG. 2 illustrates another non-limiting embodiment of a network architecture of the present disclosure for one or more buyers to purchase one or more items from a merchant.

FIG. 2 illustrates one non-limiting embodiment of a client, buyer, or consumer at a user terminal or portal communicating with a merchant through a central server. Here, the merchant 210 can have one or more cameras, such as cameras 212, 214, 216, and 218 obtaining live streaming video of one or more items for sale, such as items 212A, 214B, 216C, and 218D, which can be marine animals or marine life. Here, video and/or images of items 212A, 214B, 216C, and 218D from a merchant location or facility can be transmitted via network in real-time or near real-time to server 200. Here, the client or buyer can view the actual items being offered for sale via a client portal 220, such as a web browser or computing device application. In one example, items 212A, 214B, 216C, and 218D can be live moving specimens (such as fish), wherein the client can view a live streaming video of items 212A, 214B, 216C, and 218D to determine the specific item's type, color, species, size, dimensions, gender, condition, livelihood, behavior, personality, health, and overall well-being, among other factors. Specifically, in one embodiment, the client may be presented with a plurality of windows 222A, 224B, 226C, and 228D streaming live or real-time video of items 212A-218D from merchant's location 210. The buyer may also be presented with a one or more e-commerce interface components/buttons 230 to purchase, tag, input quantity, favorite, and/or add to cart, wherein buttons 230 correspond to each of items 212A-218D. Additionally, the client/buyer may be presented with additional interface buttons to select from, such as to obtain additional video/images, command the camera at the merchant location to move to various directions/angles/zoom view of the one or more items, chat/message with the merchant, video chat with the merchant, and/or request help or additional information on an item, among others. In addition, items 212A-218D may also have an item identification code or name associated with it, wherein the user can skip the streaming purchase of each item by just entering the codes of the items into an order form.

Figure 3:
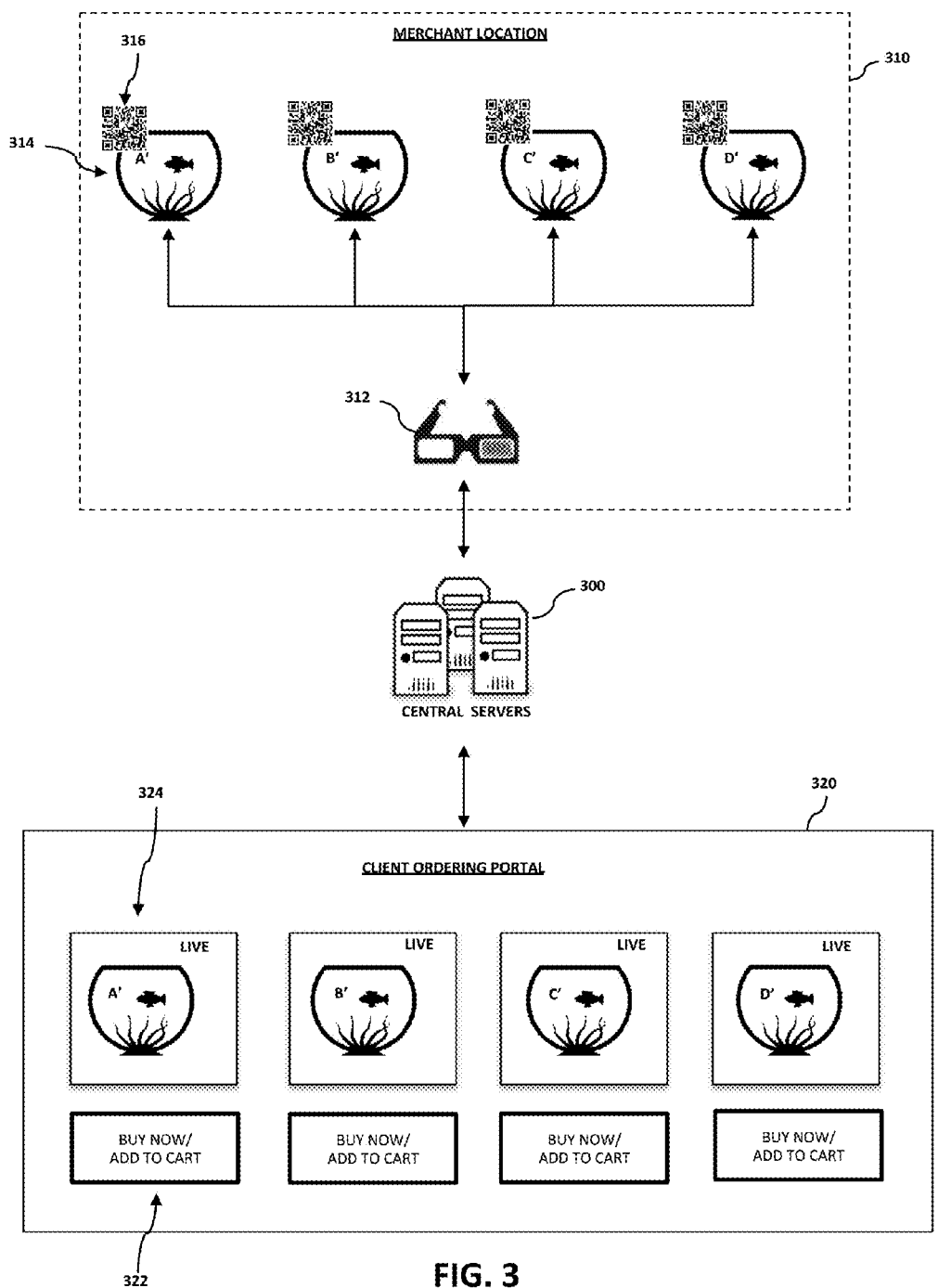
FIG. 3 illustrates another non-limiting embodiment of a network architecture of the present disclosure for one or more buyers to purchase one or more items from a merchant.

FIG. 3 illustrates another non-limiting embodiment of a client ordering and/or purchasing items from a merchant location or facility via live streaming video of items for sale. Specifically, central server 300 communicates bi-directionally via a network with video camera 312 at a merchant location 310. Here, camera 312 can be a wearable eyewear video camera, such as Google® Glasses, wherein a sales representative at a merchant location can be wearing camera 312 to demonstrate one or more of items 314 to one or more clients at client portal 320 via one or more live video streaming windows or graphical user interfaces 324 corresponding to one or more items 314. For example, a client can verbally or via messaging instruct the sales representative wearing camera 312 to move to certain locations at the merchant location to view certain items 314, such as item A', B', C', or D', which can be living (i.e. marine life) or non-living (i.e. physical static or moving goods). In addition, items 314 can have bar codes or Quick Response Codes (QR codes) 316 associated with them, so that when camera 312 is placed on QR codes 316 associated with an item the client can view all the product information (i.e. description, price, quantity, etc.) associated with the item at their portal 320. Additionally, the client/buyer may be presented with e-commerce buttons 322 to purchase or order one or more items demonstrated by the sales representative at the merchant location, facility, or other location.

Figure 4:
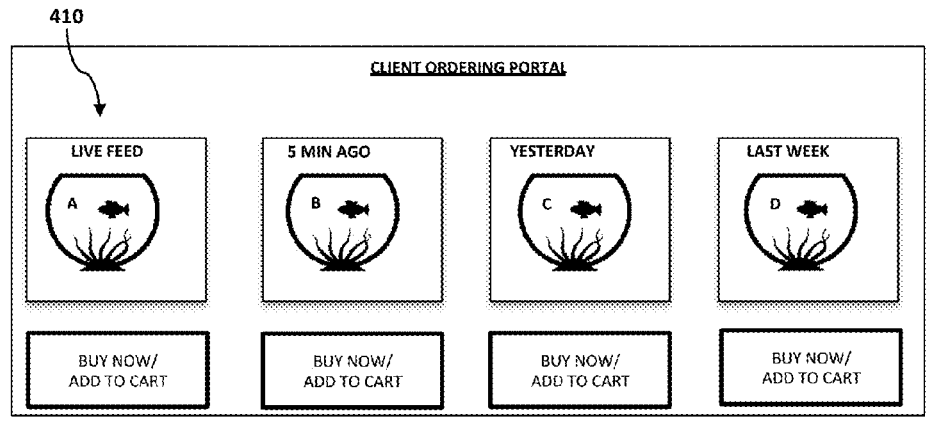
FIG. 4 illustrates a non-limiting embodiment display or graphical user interface for an ordering interface at a client, buyer, or consumer portal.

FIG. 4 illustrates one non-limiting embodiment for a client portal/interface demonstrating various types of image and/or video windows 410 of items for sale at a merchant location. For example, the client may be presented with a window showing a live streaming video of one or more items and/or one or more windows showing delayed or pre-recorded video/image of one or more items. Further, the one or more images/videos can be time-stamped. In addition, for pre-recorded or delayed video, the user may request the merchant to stream real-time or live video of the item(s) he or she is interested in. Alternatively, the user may request, operate, or control video cameras at the merchant location or facility to focus in on or obtain video from the one or more items in merchant's inventory that the user is interested in.

Figure 5:
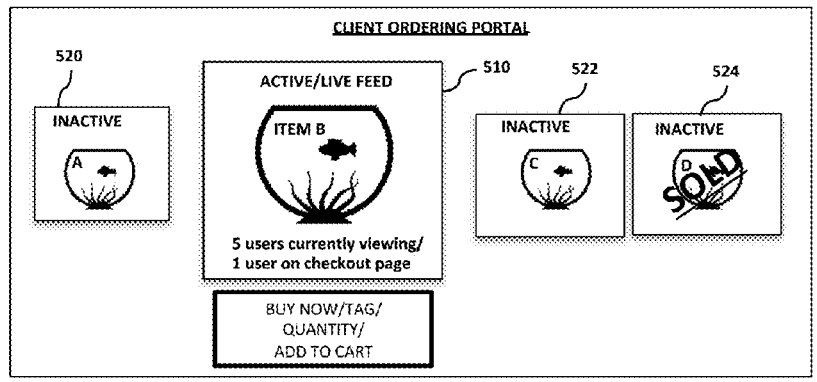
FIG. 5 illustrates another non-limiting embodiment display or graphical user interface for an ordering interface at a client, buyer, or consumer portal.

FIG. 5 illustrates another non-limiting embodiment for a client portal/interface demonstrating various views of the items being offered for sale by a merchant. For example, at any time an active/live video stream may be selected by the client and viewed in a large window 510 and other inactive windows 520, 522, and 524 may be shown in a smaller, distorted, or in an inactive (i.e. non-moving or moving) state. In other embodiments, either of windows 520, 522, and 524 may become activated (similar to window 510) as a user selects the inactive window. In addition, if an item 524 being offered by the merchant has been sold, then the merchant can (or merchant's servers/systems) can automatically or manually terminate the live or pre-recorded streaming of that item to the client portals or user terminals, or alternatively, show a distorted video image, or video of the tank with the item removed. In addition, the client portal may also display how many viewers or users are currently viewing the item being offered for sale and how many or if any are on the purchase or checkout portal, hence indicating or advising other user's that the item will soon be sold. In addition, user's or buyers may also bid, similar to an online auction, on the video streaming items being offered for sale, wherein the merchant can set a reserve price, time, and/or buy it now options.

Figure 6:
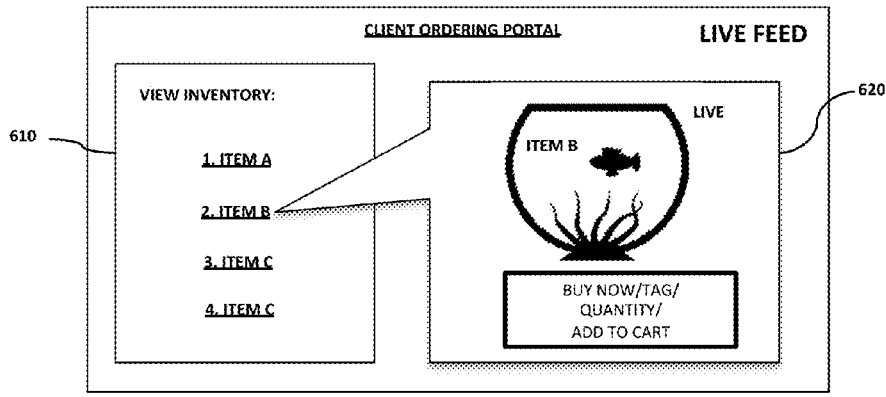
FIG. 6 illustrates another non-limiting embodiment display or graphical user interface for an ordering interface at a client, buyer, or consumer portal.

FIG. 6 illustrates another non-limiting embodiment for a client/portal interface demonstrating various views of the items being offered for sale by a merchant. Here, the client can be presented with a window 610 providing text (or thumbnail static image or thumbnail live video feeds) listing of items for sale. Here, any of items listed in window 610 may be enlarged or viewed in a separate larger interface 620 by either selecting or hovering over the items. The user may also simply take note, tag, add to favorites, or add to cart one or more the items and go directly to a purchasing or checkout/shipping portal.

Figure 7:
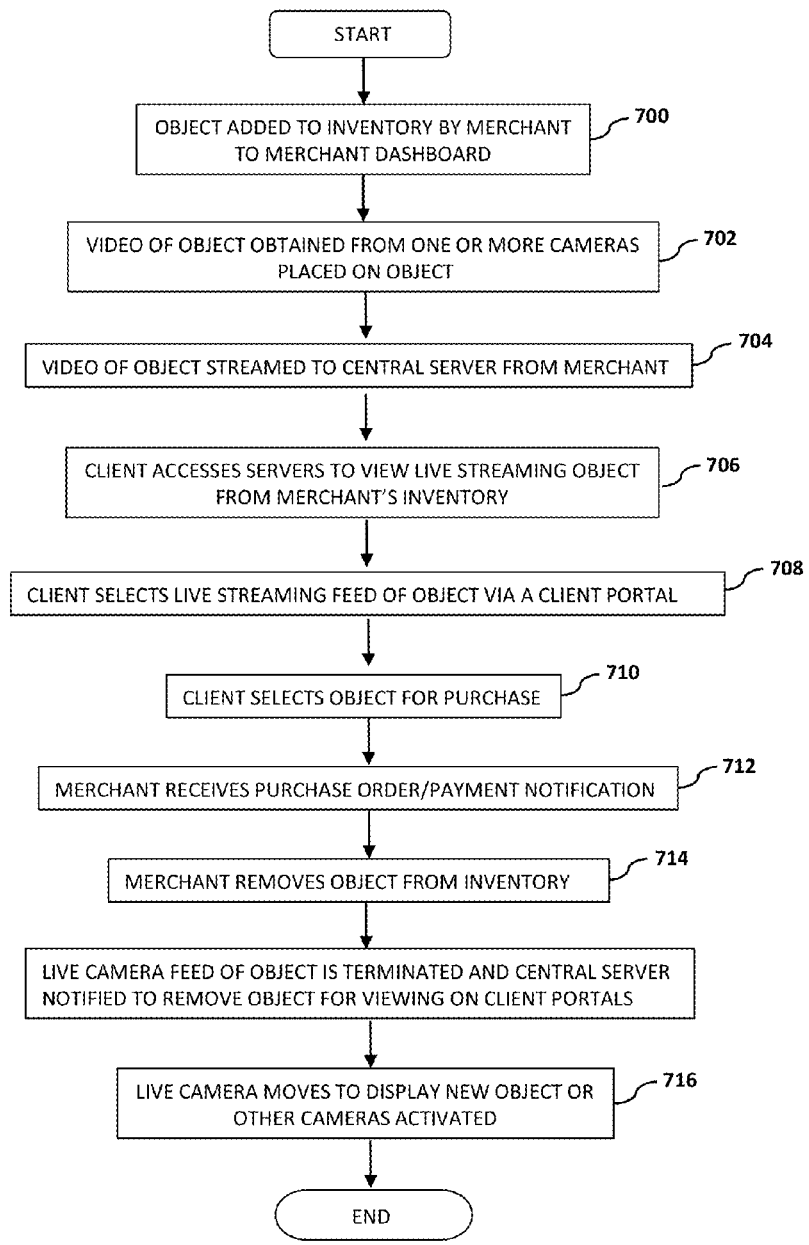
FIG. 7 illustrates one non-limiting embodiment of a flow-chart for a method of creating, adding, purchasing, and removing items from an online e-commerce website.

FIG. 7 illustrates one non-limiting embodiment of a method of creating, adding, purchasing, and removing video recorded items from an online e-commerce website or portal. Here, at step 700, one or more living or non-living objects or item for sale can be added to a merchant's inventory using a dashboard/portal provided to the merchant, such as from an admin terminal or portal. For example, if offering for sale marine life, the merchant can enter the description of the item, care instructions, region where the marine life is native to, quantities, and other related aspects of the item or marine life. At step 702, the merchant can place one or more cameras on one or more items at the merchant location to obtain either live, real-time, near real-time, or recorded video/images of the one or more items. In addition, the merchant may adjust or control the position of one or more cameras that are streaming or recording the item being offered for sale, rent, or lease. At step 704, the video/images of the one or more items are transmitted, uploaded, and/or streamed live (or in a delayed time session) via a network to one or more servers or directly to a client's portal or computing device. At step 706, the servers or merchant can allow one or more clients or user terminals with computing device to directly view either a live or pre-recorded image/video of one or items for sale. At step 708, the system or servers can receive one or more selections from the client via the client portal to view either a live or pre-recorded image/video of the items. In addition, the system, servers or merchant may receive additional requests, commands, or queries from the client portal, such as adjusting the position or viewing options of one or more cameras, inquiries about the items, negotiations, among others.

Still referring to FIG. 7, at step 710, the system, merchant, or servers can receive a purchase order or purchase request from the client user of the one or more items being displayed at the client's portal. At step 712, once the one or more items being displayed at the client portal are purchased, the system or merchant can be automatically notified of the purchase. At step 714, the merchant or automated system can automatically or manually remove the purchased item/object from merchant's inventory. With respect to marine life, the merchant may remove the same marine life item, identified by a item code, from the compartment, storage vessel, tank, or inventory at the merchant's facility that was being streamed to the client via their portal who purchased and paid for the specific marine life or item, identified by its item code. The merchant may then package the item for shipping to the client or buyer. At step 716, the camera feed of that particular object/item at the merchant location facility can be terminated, altered, modified, distorted, and/or removed from either the merchant's location, merchant dashboard, servers, user terminals, and/or client portal user interfaces. Alternatively, the system may just stream video of the compartment, tank, storage that the sold item was being held, wherein other users or potential buyers can see via their portals that there is no item to purchase within that compartment or tank.

Figure 8:
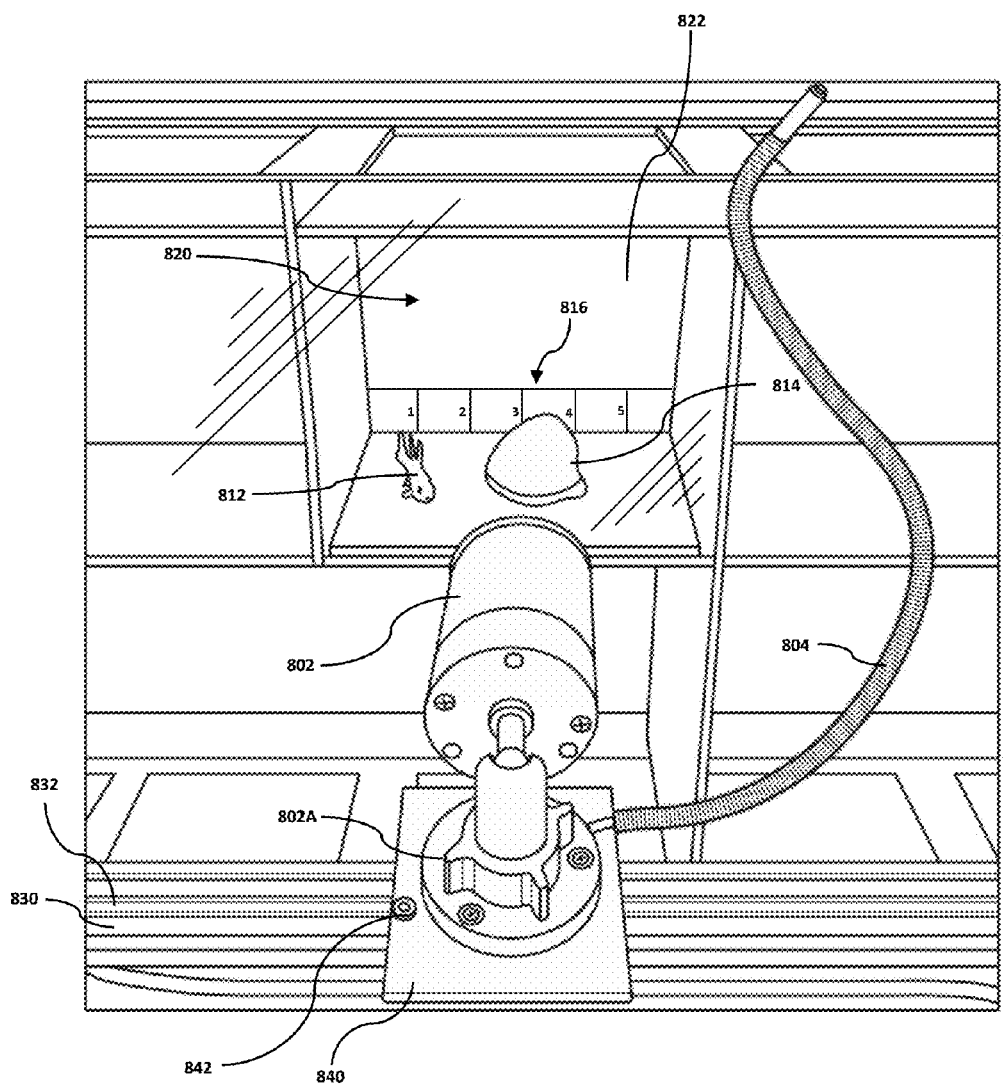
FIG. 8 illustrates one non-limiting embodiment of a perspective view of a camera video recording live or pre-recorded stream of marine life and feeding the recording or life streaming video to an end user portal for viewing or purchase of the marine life.

FIG. 8 illustrates one non-limiting embodiment of a video camera, item for sale, and storage compartment set up at a merchant location or facility. More specifically, the facility can include a plurality of storage compartments or aquarium tanks 820 for holding or storing marine life being offered for sale through a merchant's website and/or at the client portal user interfaces. For example, the item here may include a fish species 812 and rock or coral 814. The storage tank may also include a measurement guide, scale, or ruler 816 that allows viewers to ascertain the size and dimensions of the item 812 being offered for sale via the client portal. In addition, the merchant may specify the dimensions of the storage tank 820. Alternatively, a measurement guide or scale may also be provided or displayed anywhere on, adjacent, within, or near the tank. For example, the guide may be a holographic image, or a digital image layered on to the video stream. In addition, the rear wall 822 and/or any of the adjacent walls may opaque, transparent, or semi-transparent and may include any type of color, art, graphics, text, images, video, or indicia. For example, in one embodiment, the back wall 822 may be a blue or green-screen or Chroma key compositing for displaying or compositing (layering) two or more images or video streams together based on color hues, wherein the technique can also be referred to as color keying or color-separation overlay. In such an embodiment, the overlaid image or video may be of the item's natural habitat, pricing information, item description, measurement guide, or any other suitable image or video selected by the merchant or alternatively selected by a client from their portal.

Still referring to FIG. 8, a video/image recording or video streaming camera 802 can be positioned or centered in front of the item being offered for sale, such as filming or recording the item through the transparent front walls of the storage vessel or tank. Here, the position of the camera can be controlled via a controller, application, or software, or manually via a person adjusting or moving the position of the camera. Here, one end 802A can be mounted or secured to a bracket, platform or base 840, wherein base 840 is further slidably mounted to rail or rack 830. More specifically, base 840 (with camera 802) is configured to move laterally along rail 830 in a horizontal plane. In one embodiment, the base 840 is secured to rack 840 via a fastener 842, wherein fastener 842 can be an elongated piece that is positioned and secured within a C-shaped channel or groove 832 of rack 830. Here, the base 840 can be loosened from the rack 830 by turning the base in either a clockwise or counter-clock wise manner thereby allowing the base to slide in any direction along rack 830. Alternatively, a motor, such as a servo motor can be mounted within base 820 wherein operation of the motor is controlled remotely and/or automatically, thereby allowing the base 820 to move, position, or slide via a motor, controller, or robotics. In addition, the camera 802 is shown coupled to a wiring 804 for powering/controlling the camera and feeding/transmitting the video stream to one or more network video recorders (NVRs), NVR servers, central servers, or directly to a user terminal. However, it is contemplated within the scope of the invention that the cameras can also be powered, controlled, operated, and transmit/receive data wirelessly.

Figure 9:
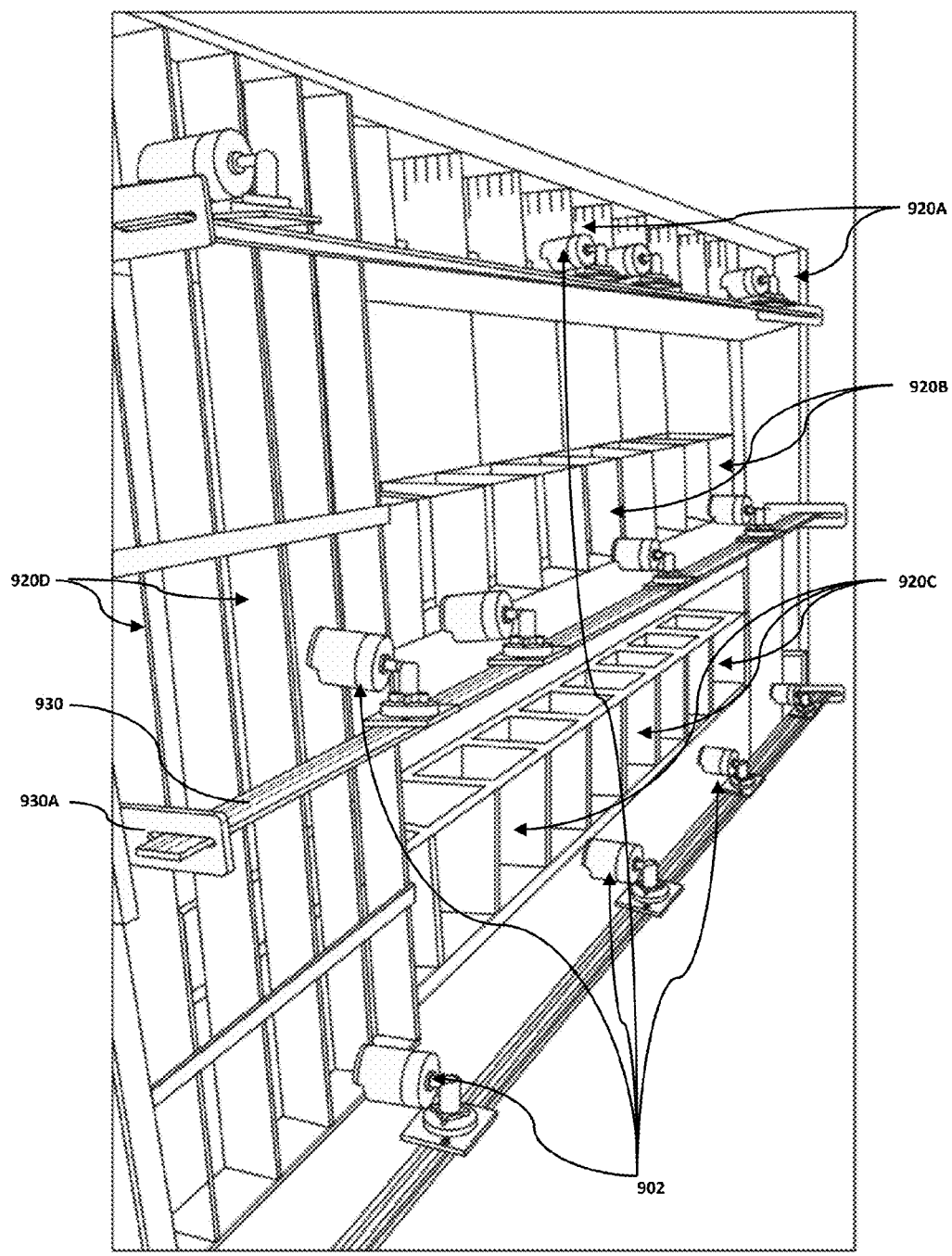
FIG. 9 illustrates one non-limiting embodiment of a perspective view of a merchant facility for a video camera recording system of live marine life held in a plurality of compartments.

FIG. 9 illustrates a perspective view of a plurality of video recording or video streaming cameras positioned to record or stream video of items or marine life held within a plurality of various sized storage tanks or compartments. For example, a plurality of network, NVR, or IP cameras 920 are positioned a merchant location or inventory facility, and may be connected and communicating one directionally or bi-directionally with one or more servers at or remote from the merchant location or directly with one or more user terminals. Here, the cameras 920 are further shown slidably mounted or secured to one or more rails or racks 930, wherein rails or racks 930 are further held or secured by a plurality of brackets 930A. However, it is contemplated within the scope of the invention that cameras may be positioned or secured by other means, such as being suspended from atop via one or more supports or supported from the ground via one or more supports. Further, the storage tanks, compartments, or aquarium water tanks, such as saltwater treated marine aquarium tanks or spring/fresh-water aquarium tanks. In addition, the marine aquarium tanks may further include but is not limited to fish or vertebrate, fish or/and vertebrae with live or non-live rock, and/or other reef aquaria. Further, there may be one or more a plurality of marine life or species per tank for viewing for video recording or live streaming video.

In addition, the plurality of storage tanks 920A, 920B, and 920C can be further subdivided or categorized depending on their size or volumetric space, the type of species it holds, or other inventory management and control criteria. Further, it is contemplated within the scope of the invention that one or more motion or object detection, heat, or infrared sensors may be present near, adjacent, in front, rear, or overhead of the one or more tanks to indicate to the merchant servers, systems, or video cameras if a specific tank has a living or not living item or marine life currently within the tank. In such an embodiment, the object detection sensors can transmit or receive commands to a controller to control operation of the one or more cameras assigned to the specific tank for that item, such as turning on/off the cameras, moving/adjusting the cameras, or tracking the item.

Figure 10:
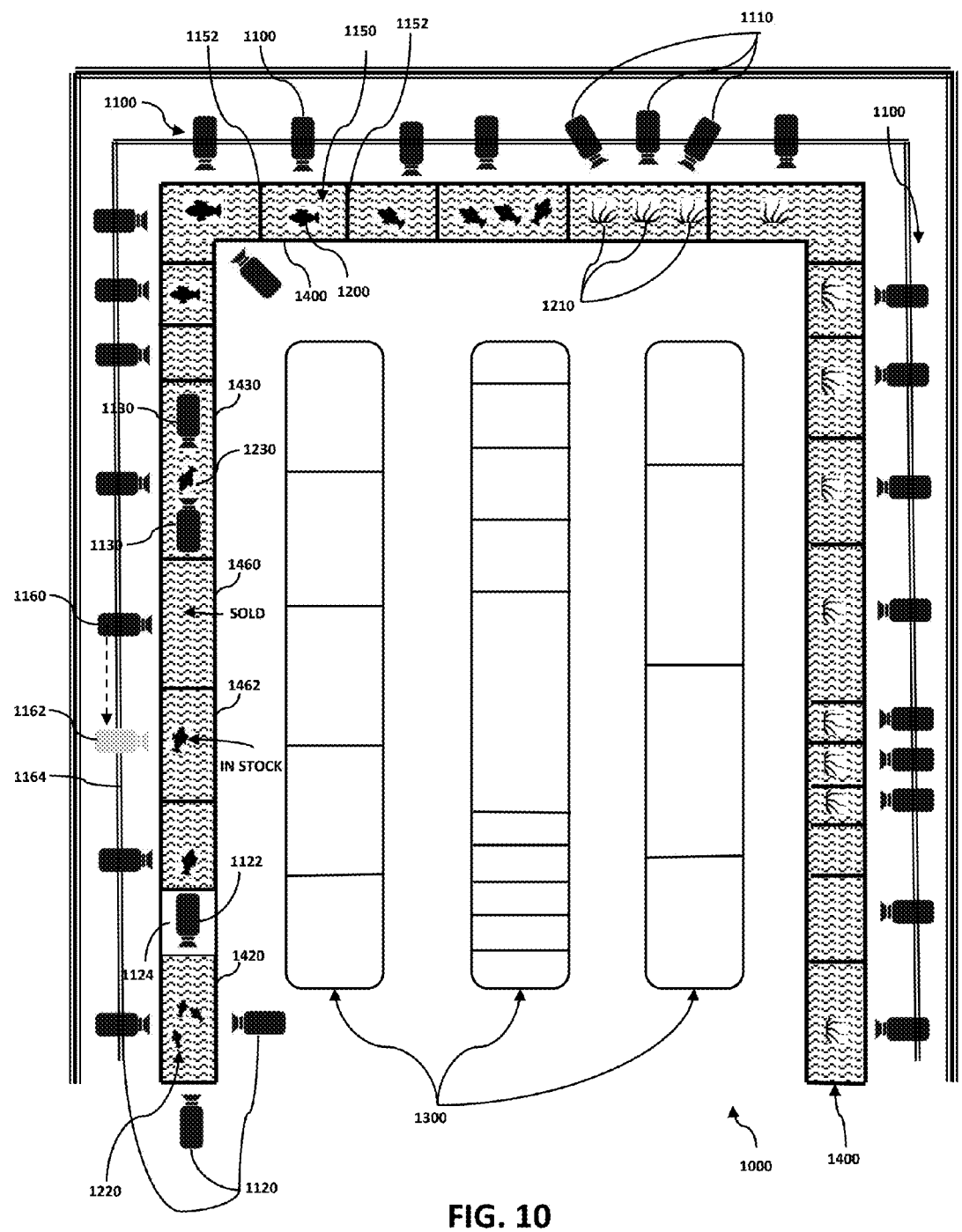
FIG. 10 illustrates one non-limiting embodiment of a top view of marine life holding compartments and video camera set-up at a merchant facility for recording and streaming video of the marine life.

FIG. 10 illustrates one non-limiting embodiment top view or overhead view of a merchant, inventory, or distribution facility or warehouse for a plurality of video recording or video streaming cameras positioned to record or stream video of items or marine life held within a plurality of various sized storage tanks or compartments. Here, the facility 1000 can include a plurality of item inventory holding containers, compartments, storage, or aquarium tanks 1300, and rows of storage or aquarium tanks 1400 that are ready for camera streaming or recording, and rows of video cameras to record or stream video/images the item contents from each of tanks 1400. Further, each item within the tanks is assigned to the particular tank for which it is held and the item and tank can be further assigned to the one or more cameras that are recording the item. The assignments can be via an identification code or identifying means, wherein the video stream of each camera is linked to the item or tank it is displaying or streaming live or real-time to an end user at his or her user terminal portal.

In one embodiment, the items contained within individual tanks 1400 can be separated from each other by dividers 1152, wherein one or more cameras 100 item are assigned to the tank to record or stream item 1200 within the tank to a user terminal or client portal. In one embodiment, a section of the facility may be assigned to hold one species or sub-species of marine life, such as fish 1200, and another section to hold another species of marine life, such as invertebrate or corals 1210. Further, there may be a plurality of items or marine life within one individual tank 1400, and in other embodiments there may be only one item per tank. Further any number of cameras 1100 may also be assigned to record or stream the contents of the tanks 1400, and any one or more camera may be positioned at various angles or view points for viewing the contents of one or more tanks 1400. For example, in one embodiment, cameras 1120 and 1122 may be positioned outside of tank 1420 in a dry or open-air environment in order to record the contents or items 1220 of tank 1420 through the transparent walls of tank 1420.

Still referring to FIG. 10, in an alternative embodiment, cameras 1130 may be submerged or within tank 1430 in order to view, stream, transmit, or record the item 1230 within tank 1430. In such an embodiment, the cameras 1130 may be sealed in a waterproof shell or casing or be water resistant or waterproof video recording cameras. In a further embodiment illustrating a method of operation of the video streaming marine life for sale business, video cameras, and/or of the e-commerce website, a camera 1160 assigned to a particular tank may move positions once an item is sold from an assigned tank or becomes available in another tank, such an adjacent tank. More specifically, when an item is sold or removed from tank 1460, the camera may automatically or manually be moved along a track, guide, or rail 1164 to another available tank 1462 having one or more items within it and further re-assigning the camera to another tank and/or item for live or real-time video transmission to the end user portal, and further automatically updating the merchant's inventory. In such an embodiment, the camera control system can further read, scan, or detect bar codes assigned to the individual tanks so that the camera control system knows which tank it is now recording or streaming to the NVR, servers, user terminal, and/or client user interface portal, or alternatively the position or coordinates of the cameras relative to the specific tanks can be pre-defined, or vice versa. Hence, the user client portal can be automatically updated with the correct streaming of the item being displayed for the specified species and item code. For example, if at the client portal (i.e. showing merchant's website) a window or box is designated to stream video of one species of marine life, such species A, then the camera system can automatically move, transmit, record, turn on/off, and position/or itself to the next available tank for that tank that holds species A, wherein the camera control system can detect via pre-assigned or pre-defined designations and position coordinates for a particular tank, reading/scanning of bar codes, or object or species identification sensors, among others. It is contemplated within the scope of the invention that the cameras and the tanks or items they are recording can be tracked and controlled at all times.

Figure 11A:
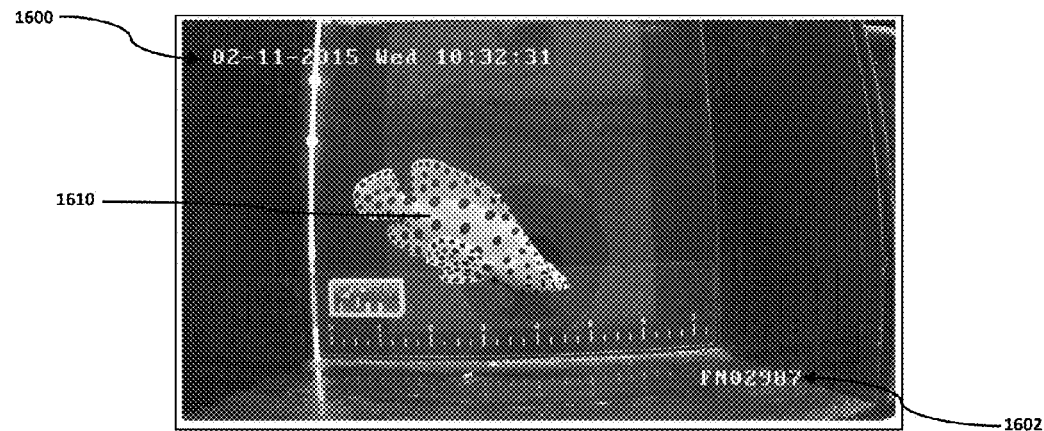
FIG. 11A illustrates one non-limiting embodiment for a graphical user interface of a live streaming video shown at a client portal of marine life enclosed in a tank.
Figure 11B:
FIG. 11B illustrates one non-limiting embodiment for a graphical user interface of a plurality of live streaming video feeds of marine life from a merchant location shown on an end user portal.

FIG. 11A illustrates a an embodiment of a graphical user interface, live, streaming, real-time, or recorded image or video feed from one or more cameras assigned to an item or marine life within one or more tanks at the merchant facility that can be accessed by a client from his or her terminal or portal, such as a web browser. The video feed can be presented at the client portal, admin portal, dashboard, or an end user for viewing, purchasing, pre-ordering, or ordering. The video feed can also illustrate a dynamic real-time or pre-recorded time/date stamp and also the item code 1602 associated to the exact item 1600 being displayed at the end user or client portal. FIG. 11B illustrates a plurality of video feeds that be shown simultaneously at a client portal, allowing the user to simultaneously view real-time or pre-recorded videos of items he or she is interested in purchasing, including the item code, name, description, and price.

Figure 12:
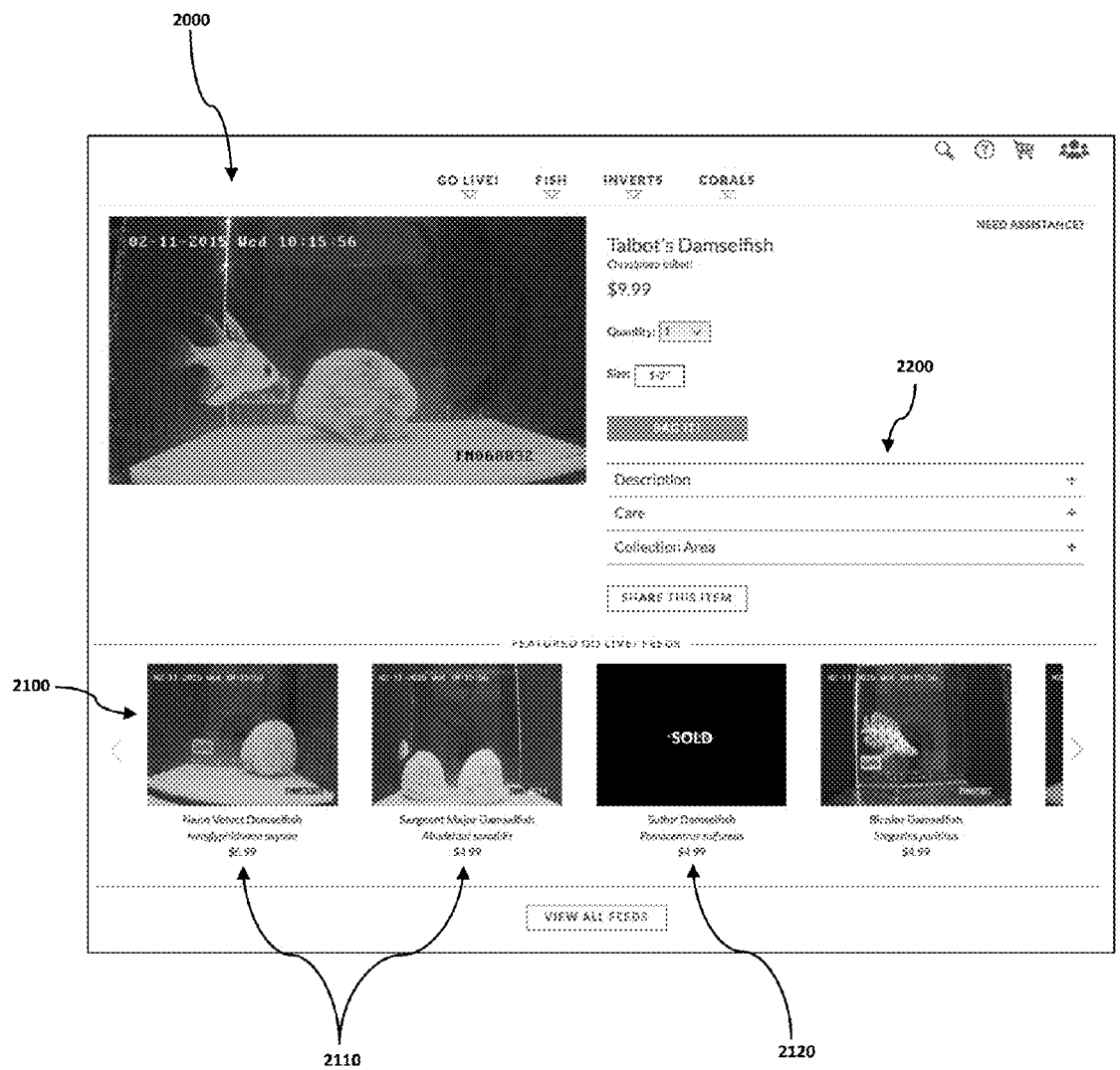
FIG. 12 illustrates one non-limiting embodiment for a graphical user interface of a user portal for viewing live or pre-recorded video of marine life, ordering, and purchasing the marine life.

FIG. 12 illustrates a graphical user interface display or screenshot at a client portal, such as a web browser viewing the merchant's website showing the items available for purchase and the associated live streaming of those items. More specifically, the portal can have an area 2000 for live, real-time, near real-time, or pre-recorded streaming video of the item being offered for sale. In addition, the item's price, size, description, care instructions, and collection area may also be displayed and viewable by a client. In addition, the portal may have an area 2100 for also displaying one or more other related items or featured items 2110 for sale or available from the merchant's inventory, wherein such featured items can also be live, real-time, near real-time, or pre-recorded streaming view of the items being recorded by cameras a the merchant's location or facility. Additionally, if an item is sold in real-time, then an embodiment of the camera feed 2120 going blank or black in real-time is shown. Alternatively, the sold item 2120 can be automatically removed from the portal or not shown at the portal until it is available again. It is contemplated within the scope of the invention that other interactive features may be available at the client portal, such as controlling the position, zoom, focus of the camera assigned to an item, viewing other camera angles of the same item, hearing the sounds or audio of the item via one or more microphones near or on the item, talking to the item through a microphone at the user terminal that can be transmitted via speakers to the item, chat features at the portal for messaging the merchant or other users viewing the item, changing the backgrounds on the back wall of the tank, interactive help library for care instructions, saving images or videos of the items, sharing the videos/images of the items with other users, among others.

Figure 13:
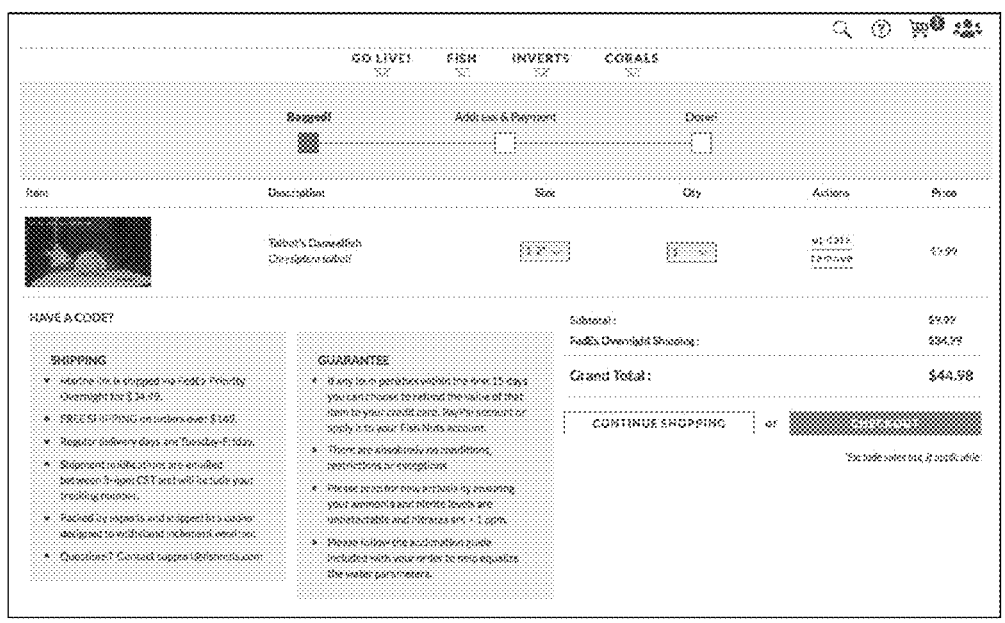
FIG. 13 illustrates a non-limiting embodiment of a graphical user interface of a user portal for purchasing the live marine life.
Figure 14A:
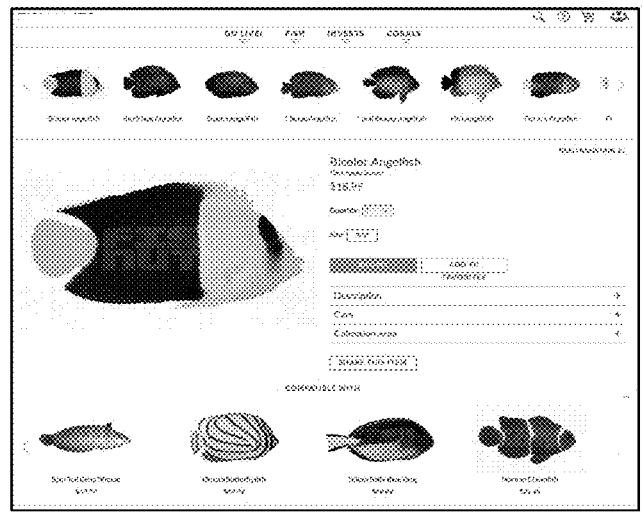
FIG. 14A-14C illustrate various embodiments for a graphical user interface of a user portal for viewing and purchasing static images of marine life for purchase.
Figure 14B:
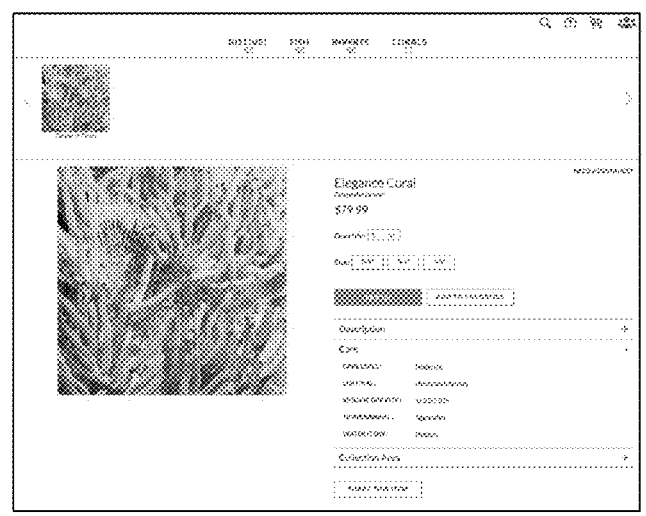
Figure 14C:
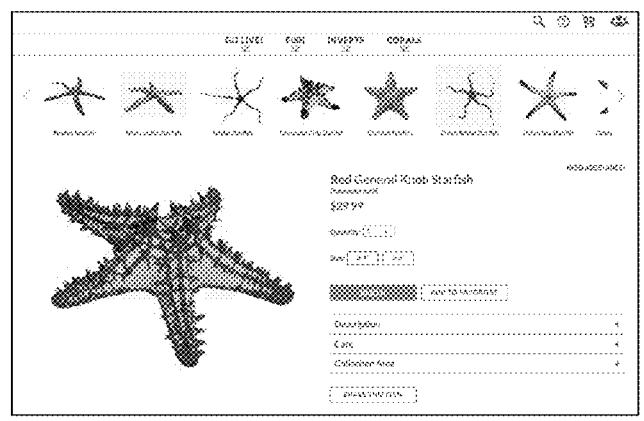

FIG. 13 illustrates an embodiment of display or screenshot of a checkout feature at the client portal. More specifically, the checkout portal may also show a live or real-time video feed of the item in a window, so that user purchasing can still see the live feed of the item all the way through payment processing/submission and after payment submission. In addition, the buyer or client may also have certain access privileges to continue viewing a live video feed of his or her purchased items, including removing the item from its storage tank by the merchant or handler and packaging of the item. FIGS. 14A, 14B, and 14C further illustrate another embodiment of the invention wherein static images of the items for purchase may also be displayed at the end user portal or webpage.

It is contemplated within the scope of the invention that any of the items or objects disclosed may be offered for sale, lease, or rent. Further, it is contemplated within the scope of the invention that other merchant's may be affiliated with a main merchant, wherein the affiliated merchant's may use their own cameras and video recording units that can communicate, transact, transmit/receive data and video feeds through the main merchant's network architecture to be displayed at one or more client portal's, wherein the client portals can display also display the affiliate merchant's items for sale. Here, the affiliate merchant's camera, protocols, computing device, or video recording units can be the same as of the main merchant or different. Alternatively, the main merchant may provide a kit having a certain guidelines, rules, protocols, storage tanks, cameras, and/or equipment for other affiliate or franchise merchant's to sell their items either through their own individual network systems or through the main merchant's network systems.

Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

What is claimed is:

1. A method for displaying and streaming video of items at a portal, comprising:
   positioning a video recording camera adjacent to a storage vessel;
   capturing streaming video from the camera of an item within the storage vessel, wherein the storage vessel comprises a graphical measurement guide having indicia in or around the storage vessel relative to the item;
   transmitting the streaming video of the item to a portal for viewing at the portal;

receiving an order request of the item from the portal, wherein the order request is specific to the item being transmitted via streaming video within the storage vessel;

processing the order request, wherein the processing comprises removing the item being transmitted via streaming video from the storage vessel and packaging the removed item for shipping;

updating an inventory based on the processed order request, wherein the updating further comprises ceasing transmission of the streaming video of the removed item to the portal based on the processed order, and wherein the ceased transmission of the video results in the removed item and the storage vessel no longer being viewable at the portal.

2. The method of claim 1, wherein the streaming is comprised of one or more of: live, real-time, near real-time, and recorded video.

3. The method of claim 1, wherein the item is comprised of marine life.

4. The method of claim 3, wherein the marine life is further comprised of one or more of: fish, invertebrate, reptiles, mammals, corals, and plants.

5. The method of claim 1, wherein the storage vessel is an aquarium tank.

6. The method of claim 1, wherein the portal is comprised of one or more web pages.

7. The method of claim 1, wherein a plurality of cameras are assigned to a plurality of storage vessel at a merchant facility.

8. The method of claim 1, wherein the camera is configured to automatically adjust position or location based on the updated inventory.

9. The method of claim 1, wherein the item is a non-living inanimate object.

10. A method for displaying and streaming video of marine animal at a portal, comprising:

placing at a merchant facility a live marine animal within an aquarium tank having a graphical measurement guide, wherein the marine animal is assigned to the tank;

positioning a video recording device adjacent to the tank, wherein the device is assigned to the tank via an identification code;

capturing video of the marine animal within the tank from the merchant facility;

transmitting live video of the marine animal in real-time to a remote end user portal for viewing of the marine animal within the tank;

receiving an order request of the marine animal from the end user portal, wherein the order request is specific to the captured video of the marine animal;

processing the order request;

physically removing the marine animal with the captured video from the tank at the merchant facility;

updating inventory based on the processed order request; and re-assigning the camera to another aquarium tank based on the updated inventory, wherein the other aquarium comprises another marine animal for live video transmission to the end user portal.

* * * * *